US012655165B2

(12) United States Patent
Yogendra et al.

(10) Patent No.: US 12,655,165 B2
(45) Date of Patent: Jun. 16, 2026

(54) POLYPHOSPHAZENE AND MOULDING COMPOUND COMPRISING THE POLYPHOSPHAZENE

(71) Applicant: Covestro Deutschland AG, Leverkusen (DE)

(72) Inventors: Sivathmeehan Yogendra, Düsseldorf (DE); Vera Taschner, Langenfeld (DE); Sven Hobeika, Solingen (DE); Ayse Deniz, Neuss (DE); Andrij Pich, Herzogenrath (DE); Sven Buschmann, Aachen (DE); Laura Hetjens, Aachen (DE)

(73) Assignee: Covestro Deutschland AG, Leverkusen (DE)

( * ) Notice: Subject to any disclaimer, the term of this patent is extended or adjusted under 35 U.S.C. 154(b) by 501 days.

(21) Appl. No.: 18/166,107

(22) Filed: Feb. 8, 2023

(65) Prior Publication Data

US 2024/0270775 A1 Aug. 15, 2024

(51) Int. Cl.
*C07F 9/6593* (2006.01)
*C08K 5/5399* (2006.01)

(52) U.S. Cl.
CPC ........ *C07F 9/65815* (2013.01); *C08K 5/5399* (2013.01)

(58) Field of Classification Search
CPC .......................... C07F 9/65815; C08K 5/5399
USPC ......................................................... 528/399
See application file for complete search history.

(56) References Cited

U.S. PATENT DOCUMENTS

| | | | |
|---|---|---|---|
| 3,419,634 A | 12/1968 | Vaughn, Jr. | |
| 3,553,167 A | 1/1971 | Schnell et al. | |
| 3,644,574 A | 2/1972 | Jackson, Jr. et al. | |
| 3,692,744 A | 9/1972 | Rich et al. | |
| 3,839,513 A | 10/1974 | Patel | |
| 4,075,173 A | 2/1978 | Maruyama et al. | |
| 4,097,446 A | 6/1978 | Abolins et al. | |
| 4,176,224 A | 11/1979 | Bier et al. | |
| 4,269,964 A | 5/1981 | Freitag et al. | |
| 4,311,823 A | 1/1982 | Shozaburo et al. | |
| 4,334,053 A | 6/1982 | Freitag et al. | |
| 4,584,360 A | 4/1986 | Paul et al. | |
| 6,528,559 B1 | 3/2003 | Nakacho et al. | |
| 6,596,893 B2 | 7/2003 | Nakacho et al. | |
| 8,563,638 B2 | 10/2013 | Kagumba et al. | |
| 2004/0039134 A1 | 2/2004 | Murakami et al. | |
| 2004/0249070 A1 | 12/2004 | Lim et al. | |
| 2012/0172500 A1 | 7/2012 | Freitag et al. | |
| 2012/0301766 A1 | 11/2012 | Monden et al. | |
| 2013/0317142 A1 | 11/2013 | Chen et al. | |
| 2015/0166787 A1 | 6/2015 | Avakian et al. | |
| 2022/0275155 A1* | 9/2022 | Paven | C07F 9/65812 |

FOREIGN PATENT DOCUMENTS

| | | | | |
|---|---|---|---|---|
| CN | 102675591 A | 9/2012 | | |
| CN | 107337806 A * | 11/2017 | H05K 1/0373 | |
| DE | 2232877 B2 | 1/1974 | | |
| DE | 2407674 A | 10/1974 | | |
| DE | 2407776 A1 | 9/1975 | | |
| DE | 2714544 A1 | 10/1977 | | |
| DE | 3007934 A1 | 9/1981 | | |
| DE | 3832396 A1 | 2/1990 | | |
| JP | 2002302598 A | 10/2002 | | |
| WO | 2021043654 A1 | 3/2021 | | |

OTHER PUBLICATIONS

Pan, CN 107337806 A machine translation in English, Nov. 10, 2017. (Year: 2017).*
W. Scholtan, H. Lange, Kolloid, Z. und Z. Polymere 250 (1972), 782-1796.
Ullmanns Enzyklopädie der Technischen Chemie, vol. 19 (1980), p. 280 ff.

* cited by examiner

*Primary Examiner* — David T Karst
(74) *Attorney, Agent, or Firm* — John E. Mrozinski, Jr.; Richard P. Bender

(57) ABSTRACT

Provided is a polyphosphazene produced by a cyclic phosphazene of formula (1)

(1)

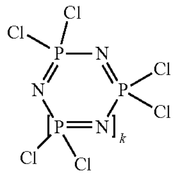

wherein k is a natural number between 1 and 10, with a bis-hydroxy-terminated phosphonate of formula (2) $HO—R^2—[O—P(O)(R^1)—O—R^2]_a—OH$ (2), wherein $R^1$ represents $C_1$- to $C_{20}$-alkyl, $C_2$-$C_{20}$ alkylene, $C_5$-$C_{20}$ cycloalkyl or $C_6$-$C_{20}$ aryl, $R^2$ represents $C_1$- to $C_{20}$-alkyl, phenyl or a bisphenyl, and n represents 1-10, in the presence of a base. Also provided is a process for producing the polyphosphazene, a moulding compound comprising the polyphosphazene and a thermoplastic polymer.

15 Claims, No Drawings

POLYPHOSPHAZENE AND MOULDING COMPOUND COMPRISING THE POLYPHOSPHAZENE

FIELD OF THE INVENTION

The present invention relates to a polyphosphazene, to a process for producing the polyphosphazene, to a moulding compound comprising the polyphosphazene and at least one thermoplastic polymer and to moulded articles comprising the moulding compound.

BACKGROUND OF THE INVENTION

Thermoplastic polymers are processed into moulded articles for a multiplicity of applications, for example for the automotive sector, for the construction sector, for household appliances and for the electricals/electronics sector. The choice of the respective polymer or else the polymer mixture of two or more polymers (polymer blend) is determined by the specific requirements of the particular application in terms of mechanical, rheological and thermal properties.

Many of these applications such as for instance electrical articles additionally require a certain flame retardancy of the moulded article. There is also a multiplicity of flame retardants that may be added to the thermoplastic moulding compound. The flame retardants may be halogen-containing or halogen-free, wherein halogen-free flame retardants have preferably been employed for some years inter alia for regulatory reasons.

Among the halogen-free flame retardants, the organic phosphorus compounds such as oligophosphates are an often employed group. They make it possible to achieve good flame retardancies and the cost of these flame retardants are also acceptable for many applications However, oligophosphates are mostly liquids, which sometimes leads to a migration of the phosphorus compound to the component surface associated with aesthetic defects. In addition, the liquid oligophosphates result in a marked reduction in the heat resistance of the moulded articles. Softening at relatively low temperatures is an intolerable limitation for some applications. The oligophosphates further result in a deterioration in mechanical properties.

Another class of phosphorus-based flame retardants is that of the phosphazenes. Said compounds result in a lesser reduction of thermal properties. Particularly for polymers having a high heat resistance, for instance polycarbonate, the use of phosphazenes has been described numerous times. WO 2014/018672 A1 discloses a flame-retarded composition comprising polycarbonate, halogen-free bisphosphate esters, talc, polytetrafluoroethylene and optionally a polyphosphazene. The composition achieves a UL 94 V-0 classification at a thickness of less than one millimeter.

WO 2013/175448 A1 discloses a flame-retarded composition comprising polycarbonate, polyester, a polysiloxane-polycarbonate copolymer and a phosphazene. The composition is characterized by good impact strength and flame retardancy.

JP 2002302598 A discloses a composition comprising 70-99% by weight of aromatic polycarbonate having a certain amount of terminal hydroxyl groups and 1-30% by weight of a crosslinked phosphazene. The composition is characterized by good impact strength and hydrolysis resistance.

US 2012/0301766 A1 discloses a composition with good flame retardancy, impact strength and color fastness. The composition comprises polycarbonate, flame retardant, fluoropolymer and graft copolymer having a sulfur content of 100-1500 ppm. The flame retardant may be a phosphazene.

EP 1444297 A1 discloses a flame retardant thermoplastic polycarbonate composition comprising a polycarbonate resin, a rubber-modified, vinyl-grafted copolymer, a phosphorus mixture of a cyclic phosphazene oligomer compound and a phosphoric acid ester as a flame retardant and a fluorinated polyolefin resin.

US 2004/0039134 A1 discloses a phosphazene composition which has a content of volatile components of not less than 0.02% by weight and not more than 1.0% by weight when heated to 200° C. for 2 hours.

The phosphazene composition features good hydrolysis resistance and, when added to a resin, provides a resin composition exhibiting a good balance between hydrolysis resistance, flame retardancy and stability of electrical properties.

The specifically employed phosphazenes are mostly cyclic compounds having predominantly three P═N units, i.e. 6-membered rings, bearing phenyl substituents on the phosphorus.

There also exist disclosures describing phosphazenes where at least two phosphazene rings are linked. EP 1104766 A1 and U.S. Pat. No. 6,596,893 B2 disclose a halogen-free flame retardant having a high melting point and low volatility which does not adversely affect the inherent properties of the resin. The flame retardant is a crosslinked phenoxyphosphazene which is obtained by crosslinking a phosphazene with crosslinking groups such as for example a polyhydric phenol or a bisphenol. The crosslinked phosphazene has no free hydroxyl groups and a certain proportion of phenyl groups. The two disclosures also describe a ratio of phenol used to employed crosslinking groups. In each case a marked excess of phenol is employed to avoid excessive crosslinking.

CN 102675591 A discloses a looped phosphazene epoxy resin and a method of synthesis thereof. The main chain of the epoxy resin comprises cyclic phosphazene structures. After the looped phosphazene epoxy resin and a hardener are cured, the resulting thermosetting resin exhibits good heat resistance, thermal stability and fire resistance.

Despite the described improvements relative to oligophosphates for example the phosphazene compounds described in the literature still lead to a noticeable deterioration in the heat resistance of the polymer matrix, which is noticeable, for example, in reduced Vicat temperatures or glass transition temperatures.

WO 2021/043654 discloses a polyphosphazene produced by reaction of a cyclic phosphazene initially with phenol and subsequently with an aromatic diphenol. The use of this polyphosphazene in a thermoplastic moulding compound allows good preservation of heat resistance.

However, there remained a need for further improved flame retardancy without markedly reducing heat resistance. In addition, flame retardants of the prior art must in some cases be produced in multistep processes which entails high cost and complexity. A multistep process is often required to improve purity and avoid undesired fractions such as for example an excessive chlorine content.

It was therefore further desirable to provide a flame retardant, preferably a phosphazene, which results in an advantageous balance of little effect on the heat resistance of thermoplastic polymers, in particular polycarbonates, and improved flame retardancy while being easy to produce, preferably in only one reaction step, optionally with additional purification. The flame retardant should be readily incorporable into the polymer matrix. It was further desirable to provide a simple process for producing the flame retardant. The polyphosphazene should have a low content of disruptive fractions, further preferably a low chlorine content, preferably after the simple production.

The flame retardancy may be determined for example via an oxygen index (LOI=Limiting Oxygen Index).

DETAILED DESCRIPTION OF THE INVENTION

It has surprisingly been found that the desired properties are achieved with a polyphosphazene produced by reaction of a cyclic phosphazene of formula (1)

(1)

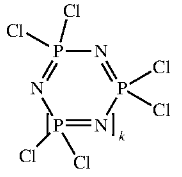

wherein k is a natural number between 1 and 10 with a bis-hydroxy-terminated phosphonate of formula (2)

(2)

$$HO—R^2—[O—P(O)(R^1)—O—R^2]_n—OH$$

wherein $R^1$ represents $C_1$- to $C_{20}$-alkyl, $C_2$-$C_{20}$ alkylene, $C_5$-$C_{20}$ cycloalkyl or $C_6$-$C_{20}$ aryl, $R^2$ represents $C_1$- to $C_{20}$-alkyl, phenyl or a bisphenyl, and n represents an integer from 1 to 10, preferably from 4 to 6, in the presence of a base.

$R^1$ preferably represents $C_1$-$C_8$-alkyl, most preferably methyl.

In $R^2$ bisphenyl is to be understood as meaning a structural unit derived from bisphenol A, bisphenol F, 4,4'-biphenol, phenolphtaleine, isosorbide, bishydroxymethylfuran, bisguaiacol F and 3,3,5-trimethylcyclohexyldiphenol. $R^2$ is most preferably derived from bisphenol A.

When the present text refers to a cyclic phosphazene, a bis-hydroxy-terminated phosphonate or a base, this may also be a mixture of different cyclic phosphazenes, bis-hydroxy-terminated phosphonates or bases. "A" is thus also to be understood as meaning "at least one". This also applies to other substances or structural units not recited here.

The polyphosphazene is largely insoluble in many customary solvents, thus very much impeding nondestructive structure determination with customary methods such as NMR spectroscopy. This can serve as an indication that the polyphosphazene has a crosslinked structure.

However, a compound having a crosslinked structure is capable of absorbing some solvents and retaining them in the network, thus undergoing swelling. The extent of swelling can be determined by the swelling factor Q after storage in a solvent for a certain length of time, wherein $$Q = \frac{a-b}{b}$$

a is the mass of the swollen polyphosphazene and b is the mass of the unswollen polyphosphazene.

For crosslinked structures the swelling factor is then greater than 0 with a suitable solvent.

The swelling factor is smaller for highly crosslinked structures than for slightly crosslinked structures.

The swelling factor depends on the solvent and for the polyphosphazene according to the invention after storage for 3 days in chloroform is preferably in a range from 0.5 to 10, more preferably from 1 to 5.

The polyphosphazene according to the invention preferably has a phosphorus content determined by elemental analysis of 12-20% by weight, more preferably 14-18% by weight.

The polyphosphazene according to the invention is useful as a flame retardant for thermoplastic polymers, in particular for polycarbonate, or mixtures of two or more polymers.

The amount of polyphosphazene used for flame retarding depends on the requirements of the particular application and on the type of the thermoplastic polymer.

An excessively low concentration results in insufficient flame retardancy and an excessively high concentration may result in impaired mechanical properties for example. The amount is preferably 2% to 20% by weight, more preferably 3% to 12% by weight, in each case based on the thermoplastic moulding compound comprising the polyphosphazene and the thermoplastic polymer and optionally further components.

Production of the Polyphosphazene

The polyphosphazene is produced as described above by reacting the cyclic phosphazene of formula (1)

(1)

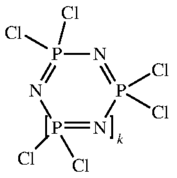

wherein k is a natural number between 1 and 10 with a bis-hydroxy-terminated phosphonate of formula (2)

(2)

$$HO—R^2—[O—P(O)(R^1)—O—R^2]_n—OH$$

wherein $R^1$ represents $C_1$- to $C_{20}$-alkyl, $C_2$-$C_{20}$ alkylene, $C_5$-$C_{20}$ cycloalkyl or $C_6$-$C_{20}$ aryl and $R^2$ represents $C_1$- to $C_{20}$-alkyl, phenyl or a bisphenyl, and n represents an integer from 1 to 10, preferably from 4 to 6, in the presence of a base.

$R^1$ preferably represents $C_1$-$C_8$-alkyl, most preferably methyl.

In $R^2$ bisphenyl is to be understood as meaning a structural unit derived from bisphenol A, bisphenol F, 4,4'-biphenol, phenolphtaleine, isosorbide, bishydroxymethylfuran, bisguaiacol F and 3,3,5-trimethylcyclohexyldiphenol. $R^2$ is most preferably derived from bisphenol A.

The cyclic phosphazenes of formula (1) are commercially available. In a preferred embodiment the employed phosphazene of formula (1) has a trimer proportion (k=1) of 60 to 100 mol %.

In a further preferred embodiment cyclic phosphazene having a trimer proportion of 100 mol % is employed. To this end the commercially available cyclic phosphazene may be purified before use by recrystallization with hexane.

Suitable bis-hydroxy-terminated phosphonates and production thereof are described for example in US2012/0172500 A1, US 2014/0018471 A1 and U.S. Pat. No. 8,563,638 B2. It is also possible to use mixtures of different phosphonates of this type.

The most preferably employed bis-hydroxy-terminated phosphonate of formula 2 is the phosphonate of formula 3. These products (with n=4-6) are obtainable from FRX Polymers (USA) under the trade name Nofia™ OL1000 and Nofia™ OL1001. This makes it possible to achieve good miscibility especially with polycarbonate as the thermoplastic polymer, (3)

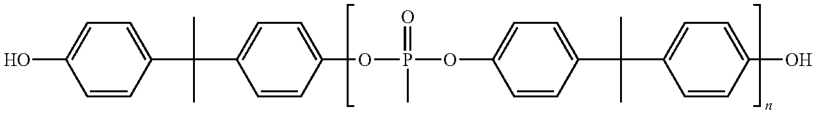

wherein n is a natural number between 1 and 10, preferably from 4 to 6.

It is preferable when the molar ratio between the bis-hydroxy-terminated phosphonate of formula (2) and the cyclic phosphazene of formula (1) is in the range from 2:1 to 4:1, more preferably between 2.5:1 and 3.5:1.

The employed base is preferably selected from 1,8-diazabicyclo[5.4.0]undec-7-ene and pyridine. 1,8-Diazabicyclo[5.4.0]undec-7-ene is particularly preferred as the base. This achieves a particularly good yield.

The reaction may be performed in organic solvents, in particular in tetrahydrofuran (THF).

The reaction is preferably performed in a temperature range from 20° C. to 80° C., in particular at room temperature. The reaction steps may be performed for example in customary glass flasks.

The base is preferably added in a molar ratio of 0.8:1 to 1.2:1 based on the OH groups of the polyphenol phosphonate.

After the reaction the polyphosphazene may be extracted from the reaction solution for example by dialysis in acetonitrile or by extraction in chloroform with aqueous sodium hydroxide solution. The reaction solution is then freed of solvent and dried in a drying cabinet at 80° C. under vacuum.

The polyphosphazene according to the invention preferably has a glass transition temperature $T_g$ of at least 40° C. The glass transition temperature is most preferably between 40 and 80° C., more preferably between 50° C. and 70° C.

Unless expressly stated otherwise in the present invention the glass transition temperature $T_g$ is determined for all components by dynamic differential scanning calorimetry (DSC) according to DIN EN ISO 11357-1-6 (2016 version) at a heating rate of 10 K/min with determination of Tg as the midpoint temperature (tangent method).

Thermoplastic Polymer

The present invention further provides a moulding compound comprising a phosphazene as described hereinabove and at least one thermoplastic polymer. Mixtures of two or more thermoplastic polymers may also be employed.

Examples of thermoplastic polymers include polycarbonates, polyesters, polyester carbonates, polyacetals (such as polyoxymethylene and polyphenylene ethers), polyamides, polyolefins, polyimides, thermoplastic polyurethanes, polysulfones, polyarylates, polyaryl ethers, vinyl (co)polymers, polyacrylates, polyarylsulfones, polyarylsulfides, polyether sulfones, polyether amides, polyphenylene sulfide, polyether ketones, polyamide imides, polyether imides and polyester imides.

Preferably employed as the thermoplastic polymer is at least one polymer selected from the group consisting of polycarbonate, polyester carbonate, vinyl (co)polymer, polyester and polyamide, more preferably a polymer selected from the group consisting of polycarbonate, polyester carbonate and polyester, particularly preferably at least one polymer selected from the group consisting of aromatic polycarbonate and aromatic polyestercarbonate, very particularly preferably an aromatic polycarbonate. Mixtures of aromatic polycarbonate and at least one vinyl (co)polymer are likewise preferred.

Aromatic polycarbonates and/or aromatic polyestercarbonates which are suitable in accordance with the invention are known from the literature or producible by processes known from the literature (for production of aromatic polycarbonates see, for example, Schnell, "Chemistry and Physics of Polycarbonates", Interscience Publishers, 1964, and also DE-AS 1 495 626, DE-A 2 232 877, DE-A 2 703 376, DE-A 2 714 544, DE-A 3 000 610, DE-A 3 832 396; for production of aromatic polyestercarbonates, for example DE-A 3 007 934).

Aromatic polycarbonates are produced for example by reaction of diphenols with carbonyl halides, preferably phosgene and/or with aromatic dicarbonyl dihalides, preferably dihalides of benzenedicarboxylic acid, by the interfacial process, optionally using chain terminators, for example monophenols, and optionally using trifunctional or more than trifunctional branching agents, for example triphenols or tetraphenols. Production via a melt polymerization process by reaction of diphenols with for example diphenyl carbonate is likewise possible.

Diphenols for production of the aromatic polycarbonates and/or aromatic polyester carbonates are preferably those of formula (4)

(4)

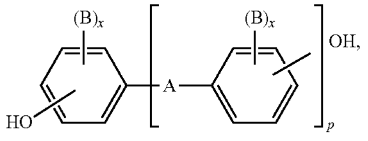

wherein

A is a single bond, C1 to C5-alkylene, C2 to C5-alkylidene, C5 to C6-cycloalkylidene, —O—, —SO—, —CO—, —S—, —SO2-, C6 to C12-arylene, onto which further aromatic rings optionally comprising heteroatoms may be fused, or a radical of formula (5) or (6)

(5)

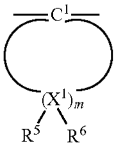

(6)

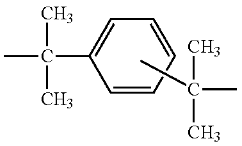

B in each case is C1 to C12-alkyl, preferably methyl, halogen, preferably chlorine and/or bromine, x is independently at each occurrence 0, 1 or 2 p is 1 or 0, and $R^5$ and $R^6$ can be chosen individually for each $X^1$ and are each independently hydrogen or C1 to C6-alkyl, preferably hydrogen, methyl or ethyl, $X^1$ is carbon and m is an integer from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis(hydroxyphenyl)-C1-C5-alkanes, bis(hydroxyphenyl)-C5-C6-cycloalkanes, bis(hydroxyphenyl) ethers, bis(hydroxyphenyl) sulfoxides, bis(hydroxyphenyl) ketones, bis(hydroxyphenyl) sulfones and α,α-bis(hydroxyphenyl)diisopropylbenzenes, and the ring-brominated and/or ring-chlorinated derivatives thereof.

Particularly preferred diphenols are 4,4'-dihydroxybiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxybiphenyl sulfide, 4,4'-dihydroxybiphenyl sulfone, and also the di- and tetrabrominated or chlorinated derivatives of these, for example 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane. 2,2-Bis(4-hydroxyphenyl)propane (bisphenol A) is especially preferred.

The diphenols may be used individually or in the form of any desired mixtures. The diphenols are known from the literature or obtainable by literature processes.

Examples of chain terminators suitable for the production of the thermoplastic aromatic polycarbonates include phenol, p-chlorophenol, p-tert-butylphenol or 2,4,6-tribromophenol, and also long-chain alkylphenols such as 4-[2-(2,4,4-trimethylpentyl)]phenol, 4-(3,3-tetramethylbutyl)phenol according to DE-A 2 842 005 and monoalkylphenol or dialkylphenols having a total of from 8 to 20 carbon atoms in the alkyl substituents, for example 3,5-di-tert-butylphenol, p-isooctylphenol, p-tert-octylphenol, p-dodecylphenol and 2-(3,5-dimethylheptyl)phenol and 4-(3,5-dimethylheptyl)phenol. The amount of chain terminators to be used is generally between 0.5 mol % and 10 mol % based on the molar sum of the diphenols used in each case.

The thermoplastic, aromatic polycarbonates preferably have mean weight-average molecular weights (Mw, measured by gel permeation chromatography in methylene chloride at 25° C. with polycarbonate based on bisphenol A as standard) of from 10 000 to 50 000 g/mol, preferably 15 000 to 40 000 g/mol, particularly preferably 20 000 to 35 000 g/mol.

The thermoplastic aromatic polycarbonates may be branched in a known manner, and preferably through incorporation of 0.05 to 2.0 mol % based on the sum of the diphenols used of trifunctional or more than trifunctional compounds, for example those having three or more phenolic groups.

Both homopolycarbonates and copolycarbonates are suitable. It is also possible to employ 1% to 25% by weight, preferably 2.5% to 25% by weight, based on the total amount of diphenols to be used, of polydiorganosiloxanes having hydroxyaryloxy end groups for producing copolycarbonates according to the invention. These are known (U.S. Pat. No. 3,419,634) and may be produced by processes known from the literature. The production of polydiorganosiloxane-containing copolycarbonates is described in DE-A 3 334 782.

Preferred polycarbonates are not only the bisphenol A homopolycarbonates but also the copolycarbonates of bisphenol A comprising up to 15 mol %, based on the molar sums of diphenols, of other diphenols mentioned as preferred or particularly preferred, in particular 2,2-bis(3,5-dibromo-4-hydroxyphenyl)propane.

In a preferred embodiment suitable polyesters are aromatic, more preferably are polyalkylene terephthalates.

In a particularly preferred embodiment they are reaction products of aromatic dicarboxylic acids or reactive derivatives thereof, such as dimethyl esters or anhydrides, and aliphatic, cycloaliphatic or araliphatic diols and also mixtures of these reaction products.

Particularly preferred aromatic polyalkylene terephthalates comprise at least 80% by weight, preferably at least 90% by weight, based on the dicarboxylic acid component, of terephthalic acid radicals and at least 80% by weight, preferably at least 90% by weight, based on the diol component, of ethylene glycol and/or butane-1,4-diol radicals.

In addition to terephthalic acid radicals, the preferred aromatic polyalkylene terephthalates may comprise up to 20 mol %, preferably up to 10 mol %, of radicals of other aromatic or cycloaliphatic dicarboxylic acids having 8 to 14 carbon atoms or of aliphatic dicarboxylic acids having 4 to 12 carbon atoms, for example radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred aromatic polyalkylene terephthalates may comprise not only ethylene glycol and/or butane-1,4-diol radicals but also up to 20 mol %, preferably up to 10 mol %, of other aliphatic diols having 3 to 12 carbon atoms or cycloaliphatic diols having 6 to 21 carbon atoms, for example radicals of propane-1,3-diol, 2-ethylpropane-1,3-diol, neopentyl glycol, pentane-1,5-diol, hexane-1,6-diol, cyclohexane-1,4-dimethanol, 3-ethylpentane-2,4-diol, 2-methylpentane-2,4-diol, 2,2,4-trimethylpentane-1,3-diol, 2-ethylhexane-1,3-diol, 2,2-diethylpropane-1,3-diol, hexane-2,5-diol, 1,4-di(β-hydroxyethoxy)benzene, 2,2-bis(4-hydroxycyclohexyl)propane, 2,4-dihydroxy-1,1,3,3-tetramethylcyclobutane, 2,2-bis(4-β-hydroxyethoxyphenyl)propane and 2,2-bis(4-hydroxypropoxyphenyl)propane (DE-A 2 407 674, 2 407 776, 2 715 932).

The aromatic polyalkylene terephthalates may be branched through incorporation of relatively small amounts of tri- or tetrahydric alcohols or tri- or tetrabasic carboxylic acids, for example according to DE-A 1 900 270 and U.S. Pat. No. 3,692,744. Examples of preferred branching agents are trimesic acid, trimellitic acid, trimethylolethane and trimethylolpropane, and pentaerythritol.

Particular preference is given to aromatic polyalkylene terephthalates which have been produced solely from terephthalic acid and the reactive derivatives thereof (for example the dialkyl esters thereof) and ethylene glycol and/or butane-1,4-diol, and to mixtures of these polyalkylene terephthalates.

Preferred mixtures of aromatic polyalkylene terephthalates comprise 1% to 50% by weight, preferably 1% to 30% by weight, of polyethylene terephthalate and 50% to 99% by weight, preferably 70% to 99% by weight, of polybutylene terephthalate.

The preferably employed aromatic polyalkylene terephthalates have a viscosity number of 0.4 to 1.5 dl/g, preferably 0.5 to 1.2 dl/g, measured in phenol/o-dichlorobenzene (1:1 parts by weight) at a concentration of 0.05 g/ml according to ISO 307 at 25° C. in an Ubbelohde viscometer.

The aromatic polyalkylene terephthalates can be produced by known methods (see, for example, Kunststoff-Handbuch, volume VIII, p. 695 et seq., Carl-Hanser-Verlag, Munich 1973).

Aromatic dicarbonyl dihalides for production of aromatic polyester carbonates are preferably the diacyl dichlorides of isophthalic acid, of terephthalic acid, of diphenyl ether 4,4'-dicarboxylic acid and of naphthalene-2,6-dicarboxylic acid.

Particular preference is given to mixtures of the diacyl dichlorides of isophthalic acid and of terephthalic acid in a ratio between 1:20 and 20:1.

Production of polyester carbonates additionally makes concomitant use of a carbonyl halide, preferably phosgene, as the bifunctional acid derivative.

Useful chain terminators for the production of the aromatic polyester carbonates include, apart from the monophenols already mentioned, the chlorocarbonic esters thereof and the acid chlorides of aromatic monocarboxylic acids, which may optionally be substituted by C1 to C22-alkyl groups or by halogen atoms, and aliphatic C2 to C22-monocarbonyl chlorides.

The amount of chain terminators is in each case 0.1 to 10 mol %, based on moles of diphenol in the case of phenolic chain terminators and on moles of dicarboxylic acid dichloride in the case of monocarboxylic acid chloride chain terminators.

The aromatic polyester carbonates may also incorporate aromatic hydroxycarboxylic acids.

The aromatic polyester carbonates may be either linear or else branched in a known manner (in this connection see DE-A 2 940 024 and DE-A 3 007 934).

Branching agents that may be used are for example tri- or polyfunctional carbonyl chlorides, such as trimesoyl trichloride, cyanuroyl trichloride, 3,3',4,4'-benzophenonetetracarbonyl tetrachloride, 1,4,5,8-naphthalenetetracarbonyl tetrachloride or pyromellitoyl tetrachloride, in amounts of 0.01 to 1.0 mol % (based on dicarbonyl dichlorides employed) or tri- or polyfunctional phenols, such as phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri (4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl) methane, 2,6-bis(2-hydroxy-5-methylbenzyl)-4-methylphenol, 2-(4-hydroxyphenyl)-2-(2,4-dihydroxyphenyl)propane, tetra(4-[4-hydroxyphenylisopropyl]phenoxy)methane, 1,4-bis[4,4'-dihydroxytriphenyl)methyl]benzene, in amounts of 0.01 to 1.0 mol % based on diphenols employed. Phenolic branching agents may be initially charged together with the diphenols; acid chloride branching agents may be introduced together with the acid dichlorides.

The proportion of carbonate structural units in the thermoplastic aromatic polyestercarbonates may be vaned as desired. The proportion of carbonate groups is preferably up to 100 mol %, in particular up to 80 mol %, particularly preferably up to 50 mol %, based on the sum of ester groups and carbonate groups.

Both the ester fraction and the carbonate fraction of the aromatic polyestercarbonates may be present in the form of blocks or in random distribution in the polycondensate.

The thermoplastic aromatic polycarbonates and polyestercarbonates may be used alone or in any desired mixture.

The vinyl (co)polymer employed as thermoplastic polymer may be rubber-free or rubber-modified. It is also possible to employ both rubber-modified vinyl (co)polymer and rubber-free vinyl (co)polymer that is not chemically bonded to a rubber or enclosed in this rubber.

The rubber-modified vinyl (co)polymer is preferably selected from graft polymers of 10% to 80% by weight, preferably 20% to 70% by weight, particularly preferably 25% to 55% by weight, of at least one vinyl monomer 20% to 90% by weight, preferably 30% to 80% by weight, particularly preferably 45% to 75% by weight, of one or more rubber-like, preferably particulate, graft substrates, preferably having glass transition temperatures<10° C., more preferably <0° C., particularly preferably <−20° C., wherein the polymer chains formed from the vinyl monomers are chemically bonded to the graft substrate or are enclosed in the graft substrate such that during production and processing of the compositions according to the invention they do not escape from this graft substrate. These vinyl monomers of the graft polymer are also referred to as the graft shell.

Glass transition temperature is determined by differential scanning calorimetry (DSC) according to DIN EN ISO 11357-1-6 (2016 version) at a heating rate of 10 K/min where Tg is defined as the mid-point temperature (tangent method).

The preferred particulate graft substrates generally have an average particle size (d50 value) of 0.05 to 10 μm, preferably 0.1 to 5 μm, particularly preferably 0.2 to 1.5 μm.

The median particle size d50 is the diameter with 50% by weight of the particles above it and 50% by weight below it. It can be determined by means of ultracentrifuge measurement (W. Scholtan, H. Lange, Kolloid, Z. und Z. Polymere 250 (1972), 782-1796).

The vinyl monomers are preferably mixtures of

50% to 99% by weight, preferably 65% to 85% by weight, preferably 70% to 80% by weight, in each case based on the entirety of the monomers of the graft shell, of vinylaromatics and/or ring-substituted vinylaromatics (such as styrene, α-methylstyrene, p-methylstyrene, p-chlorostyrene) and/or (C1-C8)-alkyl (meth)acrylates, such as methyl methacrylate, ethyl methacrylate and butyl acrylate, and 1% to 50% by weight, preferably 150% to 35% by weight, particularly preferably 20% to 30% by weight, in each case based on the entirety of the monomers of the graft shell, of vinyl cyanides (unsaturated nitriles such as acrylonitrile and methacrylonitrile) and/or (C1-C8)-alkyl (meth)acrylates, such as methyl methacrylate, n-butyl acrylate, t-butyl acrylate, and/or derivatives (such as anhydrides and imides) of unsaturated carboxylic acids, for example maleic anhydride and N-phenylmaleimide.

Preference is given to mixtures of at least one of the monomers styrene, α-methylstyrene and methyl methacrylate with at least one of the monomers acrylonitrile, n-butyl acrylate, maleic anhydride and methyl methacrylate.

Mixtures of styrene and acrylonitrile are particularly preferred. Likewise preferably employed as the graft shell is methyl methacrylate.

Graft substrates suitable for the graft polymers are for example diene rubbers, EP(D)M rubbers, i.e. those based on ethylene/propylene and optionally diene, acrylate, polyurethane, silicone, chloroprene, and ethylene/vinyl acetate rubbers and also silicone/acrylate composite rubbers.

Preferred graft substrates are diene rubbers, for example based on butadiene and isoprene, or mixtures of diene rubbers or copolymers of diene rubbers or mixtures thereof with further copolymerizable monomers.

Pure polybutadiene rubber is particularly preferred as the graft substrate.

Particularly preferred graft polymers are for example ABS polymers as described for example in DE-OS 2 035 390 (=U.S. Pat. No. 3,644,574) or in DE-OS 2 248 242 (=GB-PS 1 409 275), or in Ullmanns Enzyklopädie der Technischen Chemie, Vol. 19 (1980), p. 280 ff.

The graft copolymers are produced by free-radical polymerization, for example by emulsion, suspension, solution or bulk polymerization.

Rubber-free (co)polymers are (co)polymers of at least one vinyl monomer, preferably selected from the group of vinylaromatics, vinyl cyanides (unsaturated nitriles), (C1 to C8)-alkyl (meth)acrylates, unsaturated carboxylic acids and derivatives (such as anhydrides and imides) of unsaturated carboxylic acids.

Especially suitable are (co)polymers of

50% to 99% by weight, preferably 65% to 85% by weight, particularly preferably 70% to 80% by weight, based on the (co)polymer, of at least one monomer selected from the group of vinylaromatics (for example styrene, α-methylstyrene), ring-substituted vinylaromatics (for example p-methylstyrene, p-chlorostyrene) and (C1-C8)-alkyl (meth)acrylates (for example methyl methacrylate, n-butyl acrylate, tert-butyl acrylate)

and

1% to 50% by weight, preferably 15% to 35% by weight, particularly preferably 20% to 30% by weight, based on the (co)polymer, of at least one monomer selected from the group of vinyl cyanides (for example unsaturated nitriles such as acrylonitrile and methacrylonitrile), (C1-C8)-alkyl (meth)acrylates (for example methyl methacrylate, n-butyl acrylate, tert-butyl acrylate), unsaturated carboxylic acids and derivatives of unsaturated carboxylic acids (for example maleic anhydride and N-phenylmaleimide).

These (co)polymers are resin-like, thermoplastic and rubber-free. Particular preference is given to the polymer of methyl acrylate and the copolymer of styrene and acrylonitrile.

(Co)polymers of this kind are known and can be produced by free-radical polymerization, especially by emulsion, suspension, solution or bulk polymerization.

The (co)polymers have a weight-average molecular weight (Mw) determined by gel permeation chromatography using a polystyrene standard of 50 000 to 200 000 g/mol, preferably of 70 000 to 170 000 g/mol, particularly preferably of 80 000 to 130 000 g/mol.

In one embodiment of the present invention amorphous and/or semicrystalline polyamides are used as the thermoplastic polymers. Suitable polyamides are aliphatic polyamides, for example PA-6, PA-11, PA-12, PA-4,6, PA-4,8, PA-4,10, PA-4,12, PA-6,6, PA-6,9, PA-6,10, PA-6,12, PA-10,10, PA-12,12, PA-6/6,6 copolyamide, PA-6/12 copolyamide, PA-6/11 copolyamide, PA-6,6/11 copolyamide, PA-6,6/12 copolyamide, PA-6/6,10 copolyamide, PA-6,6/6,10 copolyamide, PA-4,6/6 copolyamide, PA-6/6,6/6,10 terpolyamide, and copolyamide formed from cyclohexane-1,4-dicarboxylic acid and 2,2,4- and 2,4,4-trimethylhexamethylenediamine, aromatic polyamides, for example PA-6,1, PA-6,1/6,6 copolyamide, PA-6,T, PA-6,T/6 copolyamide, PA-6,T/6,6 copolyamide, PA-6,1/6,T copolyamide, PA-6,6/6,T/6,1 copolyamide, PA-6,T/2-MPMDT copolyamide (2-MPMDT=2-methylpentamethylenediamine), PA-9,T, copolyamide formed from terephthalic acid, 2,2,4- and 2,4,4-trimethylhexamethylenediamine, copolyamide formed from isophthalic acid, laurolactam and 3,5-dimethyl-4,4-diaminodicyclohexylmethane, copolyamide formed from isophthalic acid, azelaic acid and/or sebacic acid and 4,4-diaminodicyclohexylmethane, copolyamide formed from caprolactam, isophthalic acid and/or terephthalic acid and 4,4-diaminodicyclohexylmethane, copolyamide formed from caprolactam, isophthalic acid and/or terephthalic acid and isophoronediamine, copolyamide formed from isophthalic acid and/or terephthalic acid and/or further aromatic or aliphatic dicarboxylic acids, optionally alkyl-substituted hexamethylenediamine and alkyl-substituted 4,4-diaminodicyclohexylamine or copolyamides thereof, and mixtures of the aforementioned polyamides.

In a further embodiment of the present invention the thermoplastic polyamides employed are semicrystalline polyamides which have advantageous thermal properties. In this context, semicrystalline polyamides having a melting point of at least 200° C., preferably of at least 220° C., more preferably of at least 240° C. and more preferably still of at least 260° C., are used. The higher the melting point of the semicrystalline polyamides, the more advantageous the thermal behavior of the compositions according to the invention. The melting point is determined by DSC.

Preferred semicrystalline polyamides are selected from the group comprising PA-6, PA-6,6, PA-6,10, PA-4,6, PA-11, PA-12, PA-12,12, PA-6,1, PA-6,T, PA-6,T/6,6 copolyamide, PA-6,T/6 copolyamide, PA-6/6,6 copolyamide, PA-6,6/6,T/6,1 copolyamide, PA-6,T/2-MPMDT copolyamide, PA-9,T, PA-4,6/6 copolyamide and the mixtures or copolyamides thereof.

Most preferably employed as the thermoplastic polymer is an aromatic polycarbonate based on bisphenol A, optionally together with vinyl (co)polymer, which may further be rubber-modified.

Further Components in the Moulding Compound

As a further component the moulding compound may optionally employ one or more polymer additives, preferably selected from the group consisting of further flame retardants, anti-drip agents, flame retardant synergists, smoke inhibitors, lubricants and demoulding agents, nucleating agents, polymeric and nonpolymeric antistats, conductivity additives, stabilizers (for example hydrolysis, heat aging and UV stabilizers and also transesterification inhibitors), flow promoters, phase compatibilizers, impact modifiers (either with or without a core-shell structure), fillers and reinforcers and dyes and pigments.

When in addition to the thermoplastic polymer and the polyphosphazene the moulding compound comprises a further component said component is preferably employed in a proportion of 0.10% to 50% by weight. This proportion is then the sum of all other components.

Anti-drip agents, flame retardant synergists, smoke inhibitors, lubricants and demoulding agents, nucleating agents, nonpolymeric antistats, conductivity additives and stabilizers are preferably each employed in a proportion of 0.10% to 1% by weight and preferably in total employed in a proportion of 0.10% to 30% by weight in each case based on the moulding compound.

When further flame retardants are used it is preferable to employ 1% to 20% by weight based on the moulding compound.

When flow promoters, polymeric antistats and phase compatibilizers are employed, the proportion used is in each case preferably 1% to 10% by weight and in total preferably 1% to 15% by weight in each case based on the moulding compound.

When dyes or pigments are employed the proportion used is in total preferably 0.1% to 10% by weight based on the moulding compound.

When fillers and reinforcers are employed the proportion used is in total preferably 3% to 30% by weight based on the moulding compound.

In a preferred embodiment at least one polymer additive selected from the group consisting of lubricants and mould release agents, stabilizers, flow promoters, phase compatibilizers, impact modifiers, further polymeric blend partners, dyes and pigments is employed.

Production of the Moulding Compound and of Moulded Articles Therefrom

A moulding compound may be produced from the polyphosphazene according to the invention and the thermoplastic polymer (or mixtures of two or more thermoplastic polymers) and the optional further components. The polyphopshazene, the thermoplastic polymer (or mixtures of two or more thermoplastic polymers) and the optional further components then form the constituents of the composition of the moulding compound.

The moulding compound according to the invention may be produced for example when the respective constituents are in familiar fashion mixed and melt-compounded and melt-extruded at temperatures of preferably 200° C. to 340° C., particularly preferably at 240° C. to 320° C. and very particularly preferably at 240° C. to 300° C., in customary apparatuses such as internal kneaders, extruders and twin-screw extruders for example. In the context of the present application this process is generally referred to as compounding.

In this process at least the thermoplastic polymer is melted, all of the constituents of the composition are dispersed and/or dissolved in one another and in a further step the resultant melt is solidified by cooling and optionally pelletized. The steps of solidification and pelletization may be performed in any desired sequence relative to one another.

The term "moulding compound" is thus to be understood as meaning the product obtained when the constituents of the composition are melt-compounded and melt-extruded.

The mixing of the individual constituents may be effected in known fashion, either successively or simultaneously, either at about 20° C. (room temperature) or at a higher temperature. This means that, for example, some of the constituents may be introduced via the main intake of an extruder and the remaining constituents may be introduced later in the compounding process via a side extruder.

The invention also provides a process for producing the moulding compounds according to the invention.

The moulding compounds according to the invention may be used to produce moulded articles of any kind. These may be produced by injection moulding, extrusion and blow moulding processes for example. A further form of processing is the production of moulded articles by thermoforming from previously produced sheets or films.

Examples of such moulded articles are films, profiles, housing parts of any type, for example for domestic appliances such as juice presses, coffee machines, mixers; for office machinery such as monitors, flatscreens, notebooks, printers, copiers; sheets, pipes, electrical installation ducts, windows, doors and other profiles for the construction sector (internal fitout and external applications), and also electrical and electronic components such as switches, plugs and sockets, and component parts for commercial vehicles, in particular for the automobile sector. The compositions according to the invention are also suitable for the production of the following moulded articles or moulded parts: internal fitout parts for rail vehicles, ships, aircraft, buses and other motor vehicles, bodywork components for motor vehicles, housings of electrical equipment containing small transformers, housings for equipment for the processing and transmission of information, housings and facings for medical equipment, massage equipment and housings therefor, toy vehicles for children, sheetlike wall elements, housings for safety equipment, thermally insulated transport containers, moulded parts for sanitation and bath equipment, protective grilles for ventilation openings and housings for garden equipment.

Further embodiments 1 to 33 are described hereinbelow:

1. Polyphosphazene produced by reaction of a cyclic phosphazene of formula (1)

(1)

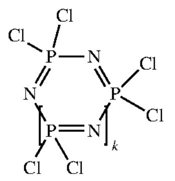

wherein k is a natural number between 1 and 10 with a bis-hydroxy-terminated phosphonate of formula (2)

(2)

$$HO—R^2—[O—P(O)(R^1)—O—R^2]_n—OH$$

wherein $R^1$ represents $C_1$- to $C_{20}$-alkyl, $C_2$-$C_{20}$ alkylene, $C_5$-$C_{20}$ cycloalkyl or $C_6$-$C_{20}$ aryl, $R^2$ represents $C_1$- to $C_{20}$-alkyl, phenyl or a bisphenyl, and n represents a natural number from 1 to 10 in the presence of a base.

2. Polyphosphazene according to embodiment 1, characterized in that n represents a natural number from 4 to 6.
3. Polyphosphazene according to embodiment 1 or 2, characterized in that $R^1$ represents methyl.
4. Polyphosphazene according to any of the preceding embodiments, characterized in that $R^2$ represents a bisphenyl derived from bisphenol A.
5. Polyphosphazene according to any of the preceding embodiments, characterized in that the molar ratio of employed bis-hydroxy-terminated phosphonate of formula (2) to employed cyclic phosphazene of formula (1) is in the range from 2:1 to 4:1, preferably 2.5:1 to 3.5:1.
6. Polyphosphazene according to any of the preceding embodiments, characterized in that the polyphosphazene has a phosphorus content of 12% to 20% by weight.
7. Polyphosphazene according to any of the preceding embodiments, characterized in that the polyphosphazene has a phosphorus content of 14% to 18% by weight.
8. Polyphosphazene according to an of the preceding embodiments, characterized in that the phosphazene has a swelling factor $$Q = \frac{a - b}{b}$$

of 0.5 to 10 after storage for 3 days in chloroform, wherein a is the mass of the swollen polyphosphazene and b is the mass of the unswollen polyphosphazene.

9. Polyphosphazene according to embodiment 8, characterized in that the swelling factor Q is in the range from 1 to 5.
10. Polyphosphazene according to any of the preceding embodiments, characterized in that the base employed is selected from 1,8-diazabicyclo[5.4.0]undec-7-ene and pyridine.
11. Polyphosphazene according to any of the preceding embodiments, characterized in that the base employed is 1,8-diazabicyclo[5.4.0]undec-7-ene.
12. Polyphosphazene according to any of the preceding embodiments, characterized in that during production the base is added in a molar ratio of 0.8:1 to 1.2:1 based on the OH groups of the bis-hydroxy-terminated phosphonate.
13. Polyphosphazene according to any of the preceding embodiments, characterized in that the polyphosphazene has a glass transition temperature determined by differential scanning calorimetry of at least 40° C.
14. Polyphosphazene according to any of the preceding embodiments, characterized in that the polyphosphazene has a glass transition temperature determined by differential scanning calorimetry of 50-70° C.
15. Polyphosphazene according to any of the preceding embodiments, characterized in that the employed cyclic phosphazene of formula (1) is a compound having a trimer proportion (k=1) of 60 to 100 mol % based on the cyclic phosphazene of formula (1).
16. Polyphosphazene according to any of the preceding embodiments, characterized in that the employed bis-hydroxy-terminated phosphonate is a compound of formula (3), (3)

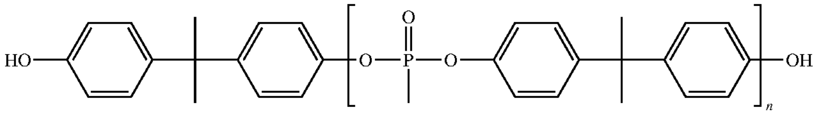

wherein n is a natural number between 4 and 6.

17. Polyphosphazene according to any of the preceding embodiments, characterized in that the reaction is performed in an aprotic solvent.
18. Polyphosphazene according to any of the preceding embodiments, characterized in that the reaction is performed in THF.
19. Moulding compound comprising a thermoplastic polymer and a polyphosphazene according to any of the preceding embodiments.
20. Moulding compound according to embodiment 19, characterized in that the thermoplastic polymer is a polyester, polycarbonate, vinyl (co)polymer, polyamide or mixtures thereof.
21. Moulding compound according to embodiment 19, characterized in that the thermoplastic polymer is an aromatic polycarbonate or a mixture of aromatic polycarbonate and vinyl (co)polymer which may further be rubber-modified.
22. Moulding compound according to any of embodiments 19 to 21, characterized in that the polyphosphazene is present in a proportion of 2% to 20% by weight.

23. Moulding compound according to any of embodiments 19 to 22, characterized in that the polyphosphazene is present in a proportion of 3% to 12% by weight.
24. Moulded article comprising a moulding compound according to any of embodiments 19 to 23.
25. Process for producing a polyphosphazene comprising reacting a cyclic phosphazene of formula (1)

(1)

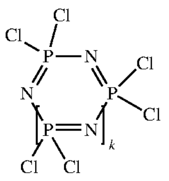

wherein k is a natural number between 1 and 10 with a bis-hydroxy-terminated phosphonate of formula (2) in the presence of a base (2)

$$HO—R^2—[O—P(O)(R^1)—O—R^2]_n—OH$$

wherein $R^1$ represents $C_1$- to $C_{20}$-alkyl, $C_2$-$C_{20}$ alkylene, $C_5$-$C_{20}$ cycloalkyl or $C_6$-$C_{20}$ aryl, $R^2$ represents $C_1$- to $C_{20}$-alkyl, phenyl or a bisphenyl and n represents an integer from 1 to 10.
26. Process according to embodiment 25, wherein n represents an integer from 4 to 6.
27. Process according to embodiment 25 or 26, characterized in that $R^1$ represents methyl.
28. Process according to any of embodiments 25 to 27, characterized in that $R^2$ represents a bisphenyl derived from bisphenol A.
29. Process according to any of embodiments 25 to 28, characterized in that the employed bis-hydroxy-terminated phosphonate is a compound of formula (3).
30. Process according to any of embodiments 25 to 29, characterized in that the reaction is performed at a temperature between 20° C. and 80° C.
31. Process according to any of the preceding embodiments 25 to 30, characterized in that the synthesis is performed in an aprotic solvent.
32. Process according to any of the preceding embodiments 25 to 31, characterized in that the reaction is performed in THF.
33. Process according to any of embodiments 25 to 32, characterized in that step b) is followed by a purification step selected from filtration and extraction.
34. Moulding compound comprising a thermoplastic polymer and a polyphosphazene produced by a process according to any of embodiments 25 to 33.

EXAMPLES

Materials

Hexachlorocyclotriphosphazene (HCCP, abcr) was recrystallized from hexane. Bis-hydroxy-terminated phosphonate of formula (3) where n(average)=6 (NOFIA OL1000, FRX Polymers) 1,8-diazabicyclo[5.4.0]undec-7-ene (DBU, Alfa Aesar), tetrahydrofuran (THF, VWR), toluene (VWR) and acetonitrile (MeCN, Roth) were used without further purification.

The polycarbonate used was MAKROLON 2600 (Covestro).

RABITLE FP 110 (Fushimi, Japan) is a phenoxyphosphazene of formula (6) having a proportion of oligomers with k=1 of 70 mol %, a proportion of oligomers with k=2 of 18 mol % and a proportion of oligomers with k≥3 of 12 mol %. This phosphazene was employed as comparative example 1.

(6)

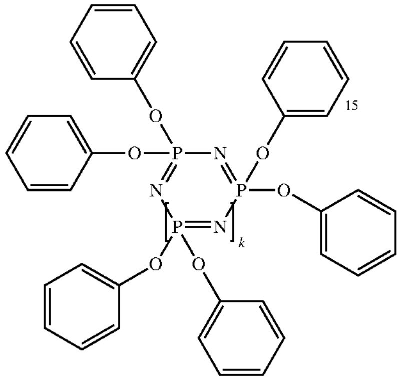

Analysis/Characterization

TGA-coupled FTIR spectroscopy was performed in a temperature range of 30° C. to 800° C. at a heating rate of 10° C.·min$^{-1}$ and an oxygen flow of 150 mL·min$^{-1}$ using a Perkin Elmer STA 600 instrument. If the phosphazenes also comprise chlorine atoms the decomposition forms HCl, which is in turn detected as an IR signal.

Limiting Oxygen Index (LOI) Measurements were made according to the standard ISO 4589:2017. Prior to measurement the samples were conditioned for at least 88 h at 22° C. and 55% humidity.

The swelling of the polymers was tested in chloroform. The (poly)phosphazenes were stored in this solvent for 3 days and the weight was determined before and after swelling. Swelling factor Q is calculated as described above according to $$Q = \frac{a-b}{b},$$

wherein
a is the mass of the swollen polyphosphazene and
b is the mass of the unswollen polyphosphazene.

DSC testing for determining the glass transition temperature $T_g$ was performed in the temperature range from 20° C. to 250° C. and −95° C. to 250° C. at a heating rate of 10° C.·min$^{-1}$ according to DIN EN ISO 11357-1-6 (2016 version) using a Perkin Elmer DSC 8500 instrument. The $T_g$ was determined as the midpoint temperature (tangent method).

The following phosphazene-based FR additives were produced or obtained and processed with MAKROLON 2600 to afford PC/FR blends:

Inventive Example: Synthesis of the Polyphosphazene

DBU (2.75 mL, 0.02 mol, molar ratio (=MR) to OH groups of the polyphosphate=1) was added dropwise at room temperature to a solution bis-hydroxy-terminated phosphonate having the trade name NOFIA OL1000 (12.91 g, 0.01 mol) and HCCP (9.6 g, 0.03 mol) in 1000 mL of THF over 5 min and the reaction was stirred overnight. After completion of the reaction the solvent was concentrated by evaporation and the reaction solution was dialysed in MeCN for 5 days and dried under vacuum at 80° C. for a further 5 days. The product was analyzed by TGA-coupled IR spectroscopy and did not show formation of identifiable amounts of hydrogen chloride. The product was obtained as a solid (18.8 g, 84%). As expected, structural determination by NMR spectroscopy was not possible due to the degree of crosslinking of the product and the associated insufficient solubility.

Comparative Example 1: Phenoxyphosphazene RABITLE FP110

For comparative example 1, the commercially available RABITLE FP 110 was used and employed as obtained.

Comparative Example 2: Synthesis of a Phenoxyphosphazene Based on EP 1104766 B1 (Molar Ratio of Altogether Employed Phenoxide to Employed Cyclic Phosphazene 6:1)

The phenoxyphosphazene described in the Examples of EP 1104766 B1 was reproduced by a modified route to avoid the use of metallic sodium and lithium. A compound having a molecular weight similar to that described in EP 1104766 B1 was obtained (1403 g/mol compared to 1130 g/mol according to EP 1104766 B1). To this end a mixture of BPA (5.71 g, 0.02 mol), sodium phenoxide (12.9 g, 0.11 mol) and DBU (3.4 mL, MR=0.5) in 80 mL of THF was added dropwise at RT over 1 h to a solution of HCCP (11.59 g, 0.03 mol) in 375 mL of MeCN. After a reaction time of 5 h sodium phenoxide (8.08 g, 0.07 mol) in 100 mL of toluene were added to this solution and the reaction solution stirred at RT overnight. After termination of the reaction the solvent was concentrated under vacuum and the residue was taken up in 100 mL of toluene and extracted 3 times with 100 mL of a 2% aqueous NaOH solution. The organic phase was additionally extracted 3 times with 100 mL of dist. water and the solvent removed under vacuum. The obtained product was dried under vacuum at 80° C. for 4 days and isolated as a gel (18.6 g).

Comparative Example 3: Synthesis of a Phenoxyphosphazene Based on CN 102675591 a (Molar Ratio of Employed Phenol to Employed Cyclic Phosphazene 4.2:1)

HCCP (1.00 g, 2.88 mmol) was dissolved in 100 mL of MeCN. A solution of phenol (1.14 g, 12.08 mmol) and DBU (1.8 mL, 12.08 mmol) in 40 mL of MeCN was added dropwise to the HCCP solution over the course of one hour. The reaction solution was stirred overnight. Once the reaction time had elapsed a solution of BPA (1.44 g, 6.33 mmol) and DBU (2.6 ml, 17.26 mmol) in 40 ml of MeCN was added dropwise to the reaction solution over the course of one hour and the mixture was stirred overnight. The reaction solution was then concentrated under vacuum and subsequently admixed with 50 mL of toluene. The organic phase was washed three times with 50 mL of 2% aqueous NaOH solution and extracted three times with 50 mL of dist. water. The solvent was removed under vacuum and the residue dried under vacuum at 80° C. for four days. The product was obtained as a viscous gel (3.04 g).

Comparative Example 4: Synthesis of a Polyphosphazene as Described in WO 2021/043654 A1

DBU (14 mL, 0.09 mol, molar ratio (=MR) to OH groups of the phenol=1) was added dropwise at room temperature to a solution of phenol (8.66 g, 0.09 mol) and HCCP (10.67 g, 0.03 mol) in 2 L of MeCN over 30 min. After 2 h, BPA (13.6 g, 0.06 mol) and DBU (18 mL, 0.12 mol, MR to OH groups of BPA=1) were added to the reaction solution and the reaction was stirred overnight. After termination of the reaction the solvent was decanted off and the product taken up in 100 mL of THF/toluene mixture in the form of a gel. The product mixture was washed alternately with THF and MeCN and dried under vacuum for 4 days at 80° C. The product was obtained as a crystalline solid (9.8 g).

Comparative Example 5: Synthesis of a Polyphosphazene from HCCP and Bisphenol a in One Reaction Step DBU (1.55 mL, 1.5 eq.) and BPA (0.79 g, 3.45 mmol) were added at room temperature to a solution of HCCP (0.4 g, 1.15 mmol) in 75 mL of MeCN and stirred for 12 hours. After completion of the reaction the solvent was decanted off and the precipitate was isolated by centrifugation (8000 rpm, 10 min) and washed four times with acetonitrile and distilled water respectively. After freeze-drying, a white powder was obtained. The product was obtained as a solid in a yield of 65%. The product was analyzed by TGA-coupled IR spectroscopy and the spectrum indicates the formation of relatively large amounts of HCl, thus indicating that the product has a markedly elevated chlorine content relative to the inventive example.

Production of PC/FR Blends

Makrolon® 2600 was mixed with different parts by weight of the inventive polyphosphazene and the comparative examples 1-3 in a Micro 15 cc Twin Screw Compounder from DSM. PC/FR blends having a % by weight ratio of PC to FR additive of 90:10, 80:20 and 70:30 were produced in this way. For the LOI measurements test specimens according to DIN4 EN ISO 4589-2:1999+A1:2006 measuring 70×6.5×3 $mm^3$ were injection moulded and for the DMA measurements test specimens measuring 60×13×2 $mm^3$ were injection moulded.

The MAROLON 2600 was pre-dried according to DIN EN ISO 7391-2:2006 (D) for (5±1) h at (120±3°) C in a pellet dryer (HELIOS WINstandard) and immediately subjected to further processing. The compounding was carried out at 270° C. in a nitrogen atmosphere at a screw speed of 100 rpm.

Results

TABLE 1

Tg and swelling factors of the pure substances

| Example | FR Additive | Tg | Swelling factor in chloroform |
|---|---|---|---|
| Inventive example: | polyphosphazene | 62° C. | 2.1 |
| Comparative Example 1 | RABITLE FP110 | −13.7° C. | 0 |

TABLE 1-continued

| Tg and swelling factors of the pure substances | | | |
|---|---|---|---|
| Example | FR Additive | Tg | Swelling factor in chloroform |
| Comparative Example 2 | Based on EP 1104766 B1 | 20.6° C. | 0 |
| Comparative Example 3 | Based on CN 102675591 A | −4.7° C. | 0 |
| Comparative Example 4 | According to WO 2021/043654 A1 | 107.9° C. | 6.07 |

The results in Table 1 show that the inventive polyphosphazene has a markedly higher glass transition temperature than the phosphazenes from inventive examples 1 to 3. Furthermore, the measured swelling factor indicates a cross-linked structure as in comparative example 4.

TABLE 1

| LOI and $T_g$ of the PC/FR blends | | | | | |
|---|---|---|---|---|---|
| PC/FR blends | | | $T_g$ of PC/FR blends % by wt. PC/FR | | |
| with | FR Additive | LOI* | 100:00 | 90:10 | 80:20 |
| Inventive example | Inventive | 32 | 149° C. | 141° C. | 132° C. |
| Comparative Example 1 | RABITLE FP100 | 29 | 149° C. | 130° C. | 107° C. |
| Comparative Example 2 | based on EP 1104766 B1 | 28 | 149° C. | 141° C. | 129° C. |
| Comparative Example 3 | based on CN 102675591 A | — | 149° C. | 111° C. | — |
| Comparative Example 4 | as in WO 2021/043654 A1 | 29 | 149° C. | 146° C. | 143° C. |

*The LOI tests were performed for PC/FR blends having a % by weight ratio of PC to FR additive of 90:10.

Table 2 summarizes the results of the various PC/FR blends and illustrates the good flame retardant effect of the phosphazenes. However, the inventive polyphosphazene lowers the glass transition temperature of a polycarbonate moulding compound to a lesser extent than the known phosphazenes of comparative examples 1, 2 and 3. In particular, the use of the FR additive from comparative example 3 resulted in a very strong reduction in the glass transition temperature and a brittle and easily breakable PC/FR blend even at a proportion of 10% by weight. It was not possible to produce standard-compliant test specimens for determining the LOI value for comparative example 3. Relative to the use of comparative example 4 as the FR additive the obtained glass transition temperature of the polycarbonate moulding material is slightly lower. However, the flame retardancy (LOI) is markedly improved and therefore the overall profile of properties comprising heat resistance and flame retardancy is advantageous for the inventive example.

Furthermore, the inventive polyphosphazene is obtainable by a very simple process comprising only one reaction step. This polyphosphazene comprises only a small amount of chlorine, chlorine being undesirable for many thermoplastics and for many applications due to disadvantageous properties. Attempting to produce a polyphosphazene such as that in comparative example 4 in only one reaction step (comparative example 5) results in a chlorine content which is markedly greater, thus considerably limiting applicability.

What is claimed is:

1. A polyphosphazene produced by reaction of a cyclic phosphazene of formula (1)

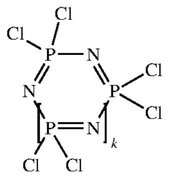

(1)

wherein k is a natural number between 1 and 10 with a bis-hydroxy-terminated phosphonate of formula (2)

$$HO-R^2-[O-P(O)(R^1)-O-R^2]_n-OH \quad (2)$$

wherein $R^1$ represents $C_1$- to $C_2O$-alkyl, $C_2$-$C_{20}$ alkylene, $C_5$-$C_{20}$ cycloalkyl or $C_6$-$C_{20}$ aryl, $R^2$ represents $C_1$- to $C_2O$-alkyl, phenyl or a bisphenyl, and n represents 1-10, in the presence of a base.

2. The polyphosphazene according to claim 1, wherein the molar ratio of the bis-hydroxy-terminated phosphonate of formula (2) to the cyclic phosphazene of formula (1) is in the range from 2:1 to 4:1.

3. The polyphosphazene according to claim 1, wherein the polyphosphazene has a phosphorus content of 12% to 20% by weight.

4. The polyphosphazene according to claim 1, wherein the phosphazene has a swelling factor $$Q = \frac{a-b}{b}$$

of 0.5 to 10 after storage for 3 days in chloroform, and wherein a is the mass of the swollen polyphosphazene and b is the mass of the unswollen polyphosphazene.

5. The polyphosphazene according to claim 1, wherein the base is selected from the group consisting of 1,8-diazabicyclo[5.4.0]undec-7-ene and pyridine.

6. The polyphosphazene according to claim 1, wherein the polyphosphazene has a glass transition temperature determined by differential scanning calorimetry of 50° C. to 70° C.

7. The polyphosphazene according to claim 1, wherein the bis-hydroxy-terminated phosphonate is a compound of formula (3)

(3)

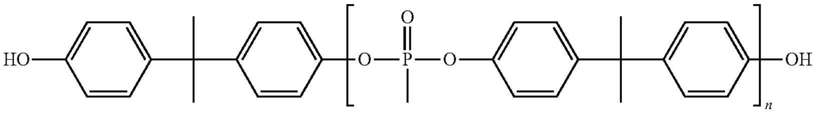

wherein n is a natural number between 4 and 6.

8. A moulding compound comprising a thermoplastic polymer and the polyphosphazene according to claim 1.

9. The moulding compound according to claim 8, wherein the thermoplastic polymer is selected from the group consisting of a polyester, a polycarbonate, a vinyl (co)polymer, a polyamide, and mixtures thereof.

10. The moulding compound according to claim 8, wherein the polyphosphazene is present in an amount of 2% to 20% by weight.

11. A moulded article comprising the moulding compound according to claim 8.

12. A process for producing the polyphosphazene according to claim 1, the process comprising reacting a cyclic phosphazene of formula (1)

(1)

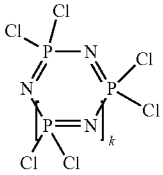

wherein k is a natural number between 1 and 10 with a bis-hydroxy-terminated phosphonate of formula (2)

$$HO—R^2—[O—P(O)(R^1)—O—R^2]_n—OH \quad (2)$$

wherein $R^1$ represents $C_1$- to $C_{20}$-alkyl, $C_2$-$C_{20}$ alkylene, $C_5$-$C_{20}$ cycloalkyl or $C_6$-$C_{20}$ aryl $R^2$ represents $C_1$- to $C_2O$-alkyl, phenyl or a bisphenyl and n represents 1-10, in the presence of a base.

13. The process according to claim 12, wherein the bis-hydroxy-terminated phosphonate is a compound of formula (3)

(3)

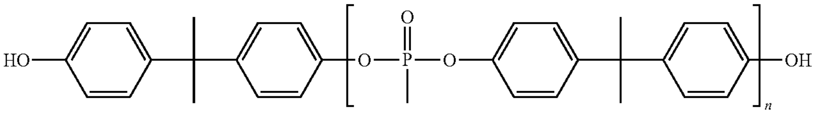

wherein n is a natural number between 4 and 6.

14. The process according to claim 12, wherein the reaction occurs at a temperature of between 20° C. and 80° C.

15. The process according to claim 12, wherein the reaction is followed by a purification step selected from the group consisting of filtration and extraction.

* * * * *